Sept. 23, 1969  G. E. SLOANE ETAL  3,468,607
APPARATUS FOR THE CONTINUOUS ANALYSIS OF A LIQUID STREAM
CONTAINING DISSOLVED SOLIDS OF WHICH A PORTION
ARE OPTICALLY ACTIVE IN SOLUTION
Filed Dec. 6, 1966  3 Sheets-Sheet 1

INVENTORS.
GEORGE E. SLOANE
KENNETH M. ONNA

BY Burns, Doane, Benedict, Swecker & Mathis

ATTORNEYS.

INVENTORS.
GEORGE E. SLOANE
KENNETH M. ONNA

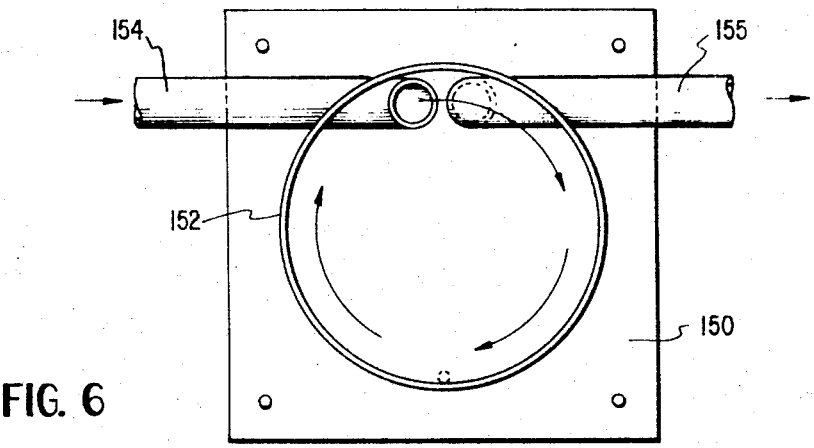
FIG. 6
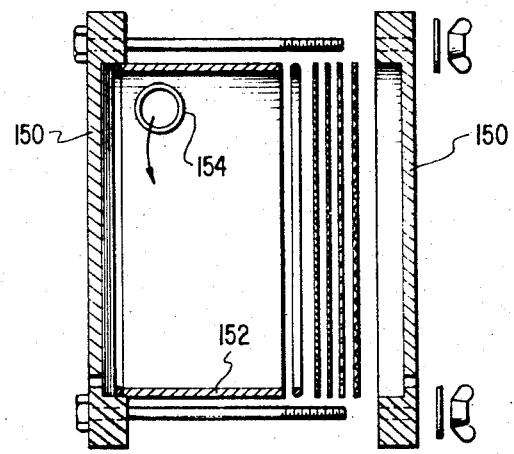
FIG. 7
FIG. 8
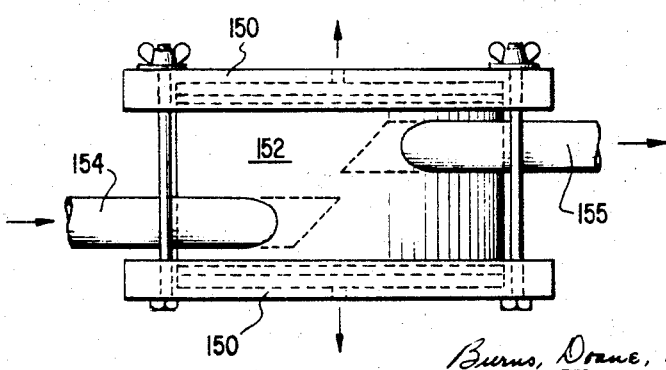
INVENTORS.
GEORGE E. SLOANE
KENNETH M. ONNA
ATTORNEYS.

3,468,607
APPARATUS FOR THE CONTINUOUS ANALYSIS OF A LIQUID STREAM CONTAINING DISSOLVED SOLIDS OF WHICH A PORTION ARE OPTICALLY ACTIVE IN SOLUTION

George E. Sloane, Honolulu, and Kenneth M. Onna, Kaneohe, Hawaii, assignors to Hawaiian Sugar Planters Association, Honolulu, Hawaii, a voluntary, non-profit agricultural organization
Filed Dec. 6, 1966, Ser. No. 599,491
Int. Cl. G01n 21/26
U.S. Cl. 356—73                7 Claims

ABSTRACT OF THE DISCLOSURE

Continuous quantitative analysis of a liquid stream (in particular a sugar solution) containing dissolved solids, some of which are optically active, is performed. A portion of the stream, optically clarified by filtration, is directed to automatically operative polarimetric and refractometric instruments. The polarimeter produces an electrical signal proportional to the concentration of optically active constituents in the stream and the refractometer produces an electrical signal proportional to the concentration of dissolved solids. The two signals are directed to a computer and recorder to produce a continuous plot of certain quantitative solution characteristics.

BACKGROUND OF INVENTION

At various stages in many sugar processes, the sugar is present in the form of a continuously flowing sugar solution stream. For accurate control of the process it is important to know certain quantitative characteristics of the stream, such as for example the percent of dissolved solids present in the stream, the amount of sucrose as a percent of the amount of dissolved solids and other such factors. Determination of these factors may conveniently be based on certain known optical characteristics of sugar solutions. For example, it is known that if a beam of polarized light is passed through a sugar solution containing sucrose, the beam will be rotated by an amount proportional to the concentration of sucrose in the stream. It is also known that the amount by which a beam of light entering a sugar solution sample is refracted from its original path is proportional to the amount of dissolved solids in the sample.

Previous methods of determination of the characteristics of sugar solutions based on the known optical properties described, having usually involved taking intermittent samples of the solution from the stream and examining the sample with a refractometer and a polarimeter. Such a process involving intermittent determination of stream characteristics is not dependable for close and accurate control of the process, particularly in situations where the solution characteristics are changing rapidly.

SUMMARY OF INVENTION

It is therefore a particular object of the present invention to provide an apparatus for continuous and instantaneous quantitative analysis of a liquid stream containing dissolved solids of which a portion are optically active.

THE DRAWINGS

In accordance with these objects, an apparatus forming one preferred embodiment of the present invention for carrying out the method thereof is illustrated in the accompanying drawings in which:

FIGURE 6 is a side view of another embodiment of the filter forming a part of the apparatus shown in FIGURE 1;

FIGURE 7 is an exploded end view of the filter shown in FIGURE 6; and

FIGURE 8 is a top view of the filter shown in FIGURE 6.

DETAILED DESCRIPTION

In describing the preferred embodiment of the invention, it is first necessary to define certain quantitative characteristics of sugar solutions (listed as follows), which it is intended to analyze.

Pol reading (PR)

Pol reading is the value read from the scale of a polarimeter graduated in units of the International Sugar Scale. Pol reading is a measure of the concentration of optically active constituents in the solution (the major part of the optically active constituents are sucrose) and has the dimensions of weight per unit volume.

Refractometer solids (Rs)

Refractometer solids is read from the refractometer and measures the percentage of dissolved solids present in the solution as a percentage by weight.

Pol factor (PF)

Pol factor is a coefficient by which the pol reading is multiplied to provide a product defined as pol percent ($p$). Pol factor is functionally related to the refractometer solids by a relationship of the following type:

$$PF = K_1 - k_1 \times Rs$$

where $K_1$ and $k_1$ are constants

Pol percent ($p$)

Defined above as the product of pol factor and pol reading, pol percent is a measure of the weight of optically active constituents present as a proportion of solids weight.

Pol purity (Pur)

Pol purity may be defined as pol percent $\times 100$ divided by refractometer solids percent.

Estimated extraction (E)

The estimated extraction of sucrose from the pressed sugar juice is functionally related to an arbitrary extraction factor and to the pol percent. The relation may be closely approximated as follows:

$$E = K_2 - k_2 \times p$$

where $K_2$ and $k_2$ are constants.

Figure 1:
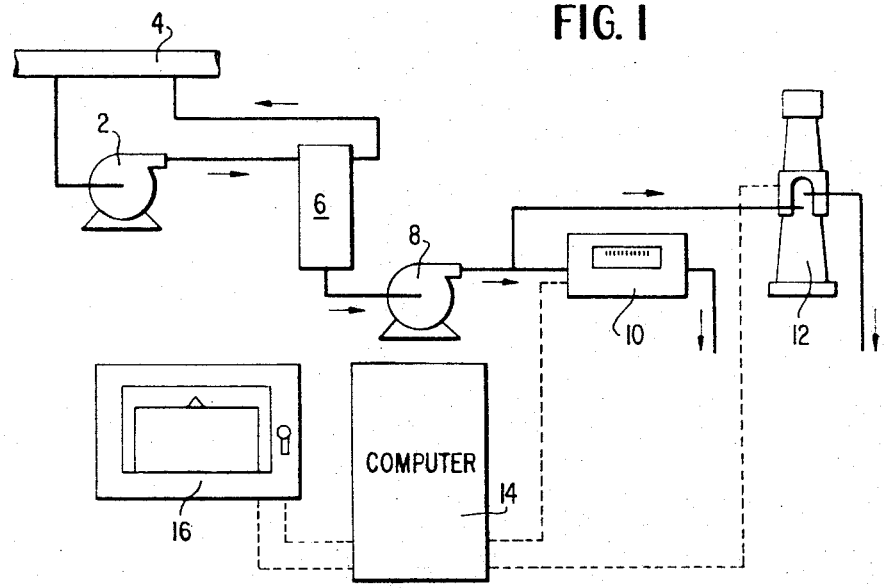
FIGURE 1 is a schematic diagram of the apparatus forming the preferred embodiment of the present invention.

Referring to FIGURE 1, the preferred embodiment of the apparatus suitable for performing the method of the invention is shown to include a sample pump 2 withdrawing a sample of liquid from a stream 4. The sample is directed to a filter 6 from which the major part of the sample is returned to the stream 4. In the filter 6, a portion of the sample is filtered to render it optically clear and is then directed by a filtrate pump 8 to the sample chambers of a refractometer 10 and a polarimeter 12, both of which are of a continuously operating, automatic type. The refractometer 10 and polarimeter 12 produce D.C. electrical outputs of voltage magnitudes corresponding to the variables involved, which are fed to a computer 14 and a recorder 16.

The refractometer 10 automatically produces an electrical output proportional to the refractive index of the sample directed to the refractometer. In the preferred embodiment, the refractometer is the model designated "Process Differential Refractometer" produced by Waters Associates, Inc., of Framingham, Mass.

The polarimeter 12 automatically produces an electrical output proportional to the concentration of optically active constituents in the sample directed to the polarimeter. In the preferred embodiment the polarimeter is the model designated Model 143A produced by Bendix Corporation, of Cincinnati, Ohio.

Although specific models of polarimeter and refractometer have been disclosed, it will be appreciated that other forms of refractometer and polarimeter possessing the desired characteristics of those described may be utilized.

Figure 2:
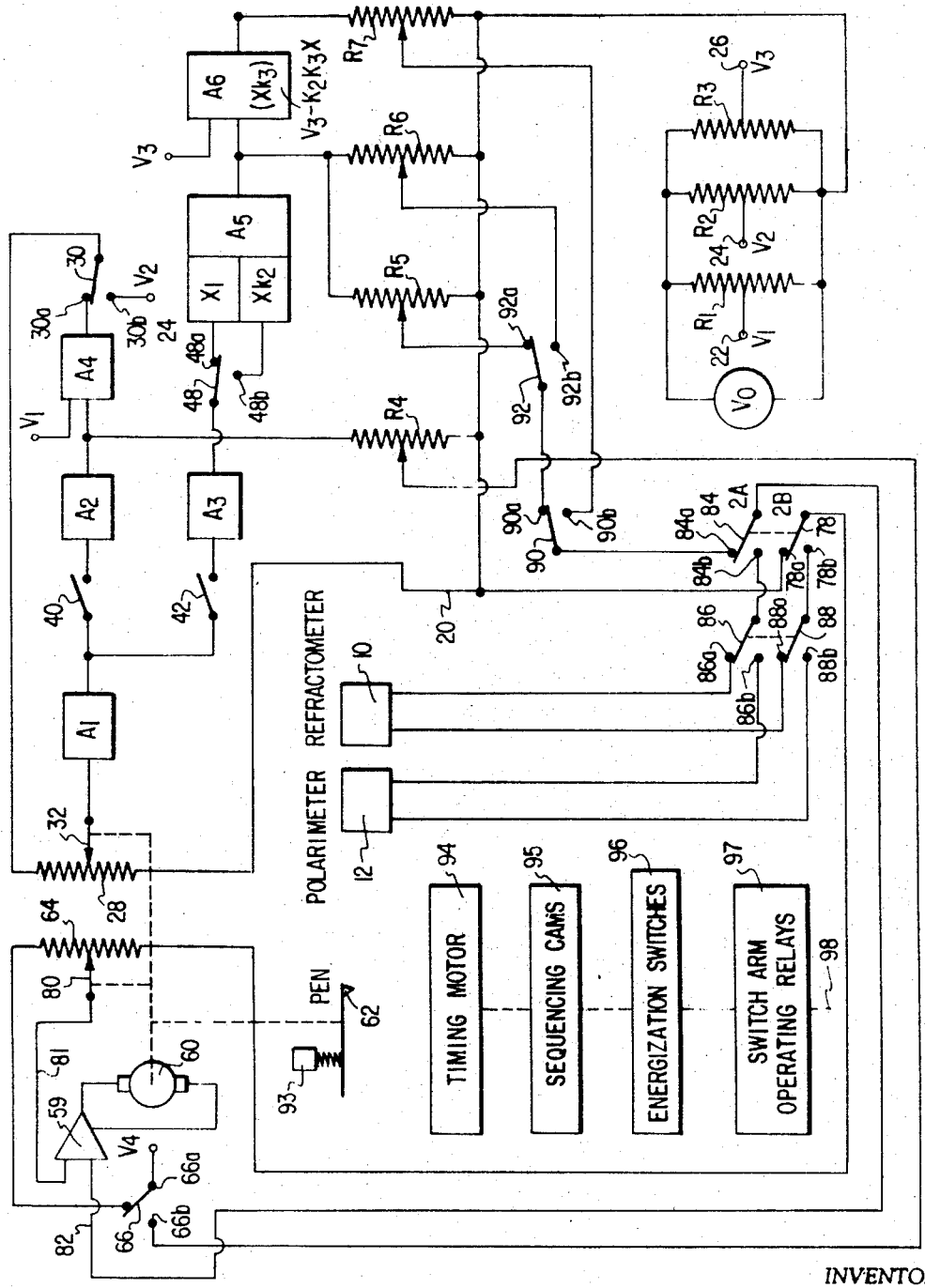
FIGURE 2 is a schematic representation of an electrical circuit forming a part of the apparatus shown in FIGURE 1.

Referring in more detail to FIGURE 2, the previously mentioned computer 14 may be seen to include a common electrical line 20 connected to one side of D.C. potential power $V_0$. Three resistors $R_1$, $R_2$ and $R_3$, in parallel with each other, are connected across the source of external potential $V_0$. Tapping points 22, 24 and 26 to the resistors $R_1$, $R_2$ and $R_3$ respectively provide fixed value potential sources $V_1$, $V_2$ and $V_3$.

A retransmitting potentiometer 28 has one of its ends connected to line 20. The other end of the potentiometer 28 is connected to a relay operated switch arm 30 engageable in inactivated and activated positions thereof respectively with fixed electrical contacts 30a and 30b. The contact 30b is connected to the previously mentioned connection point 24. The retransmitting potentiometer 28 also includes a slidable connection 32 driven along the potentiometer in a manner to be described. The slidable connection 32 is connected to an amplifier $A_1$.

The amplifier $A_1$ is connected to an amplifier $A_2$. The amplifier $A_1$ is also connected to an amplifier $A_3$. Sets of normally open, relay operated contacts 40 and 42 are interposed between the amplifier $A_1$ and the amplifiers $A_2$ and $A_3$ respectively. The amplifier $A_2$ possesses the characteristic that it follows the output of the amplifier $A_1$ when it is electrically connected to the amplifier $A_1$ by activation of the relay operated contact 40. Disconnection from amplifier $A_1$ causes the amplifier $A_2$ to remain at the potential of the last signal applied to the amplifier $A_2$. The amplifier $A_3$ behaves in a similar manner to that just described for the amplifier $A_2$.

The amplifier $A_2$ is connected to an amplifier $A_4$ which multiplies the output of the amplifier $A_2$ by a fixed factor $k_1$. A fixed reference voltage $V_1$ tapped from the previously mentioned connection point 22 is also connected to the amplifier $A_4$ in opposite sense thereto so that the output of the amplifier $A_2$ after multiplication in the amplifier $A_4$ is subtracted from the fixed value reference signal $V_1$ to provide a difference signal which is fed to the contact 30a.

The amplifier $A_3$ is connected to an amplifier $A_5$ through a relay operated switch arm 48 contacting a fixed electrical contact 48a in an inactivated condition of the relay operated switch arm. The amplifier $A_5$ normally inverts the output of the amplifier $A_3$ without changing its magnitude. However, activation of the relay operated switch arm 48 to engage another fixed electrical contact 48a connected to the amplifier $A_5$ alters the characteristics of the amplifier $A_5$ so that it multiplies the output from the amplifier 38 by a fixed factor $k_2$, denoted the extraction factor, which may be varied by manual adjustment of various circuitry (not shown) of the amplifier $A_5$.

The amplifier $A_5$ is connected on its output side to the input of another amplifier $A_6$ which multiplies the output of the amplifier $A_5$ by a fixed factor $k_3$. A fixed reference voltage $V_3$ is also connected to the amplifier $A_6$ in opposite sense thereto so as to provide an output signal equal to the difference between $V_3$ and the multiplied output of the amplifier $A_5$.

The amplifier $A_2$ on its output side is connected to line 20 by a resistor $R_4$. The amplifier $A_5$ on its output side is connected to line 20 through resistors $R_5$ and $R_6$ in parallel. The amplifier $A_6$ on its output side is connected to line 20 through a resistor $R_7$.

The previously mentioned recorder 16 includes a motor 60 which is driven by a servo amplifier 59 and is drivingly connected to a marking pen 62 of the recorder. The motor 60 also mechanically drives the previously mentioned sliding arm 32 of the retransmitting potentiometer 28. The recorder further includes a recorder slide wire potentiometer 64.

At one end the potentiometer 64 is connected to a relay operated switch arm 66 engaging a fixed electrical contact 66a in the inactivated condition of the relay and engaging another fixed contact 66b in the activated condition of the relay. The contact 66a is connected to an internal potential source at a constant D.C. calibration voltage $V_4$. At its other end the potentiometer 64 is connected to a relay operated switch arm 78 engaging a fixed electrical contact 78a in the inactivated condition of the relay operated switch arm and engaging another fixed electrical contact 78b in the activated condition of the relay operated switch arm. The contact 78a is connected to line 20.

A movable electrical contact 80 on the potentiometer 64 may be moved therealong by the motor 60 and is electrically connected to one input 81 of the servo amplifier 59. The other input 82 of the servo amplifier 59 is electrically connected to a relay operated switch arm 84. The servo amplifier inputs 81 and 82 are arranged so that the potential between the input 82 and line 20 (referred to as the input potential) is in opposite polarity to the potential developed across that portion of the potentiometer 64 between the slide wire 80 and the base line 20 so that when the potentials are of equal value there is no net current through the motor 60 and it ceases to turn. When there is an out-of-balance condition, the motor input is poled to drive the slide wire 80 along the potentiometer 64 until a balance condition is attained. The recorder is calibrated for a particular value of the calibration voltage $V_4$ applied across the potentiometer 64. In the balance condition the pen 62 is driven to the position to record the value of the input signal and at the same time the slidable connection 32 of the retransmitting potentiometer 28 will also be moved.

The description of the recorder as given above is much simplified; however, one example of a recorder suitable for the practice of the present invention utilized in the preferred embodiment is the Model KY153x12–VH–II–III–IV, 0–50 mv. range, manufactured by Minneapolis Honeywell Regulator Company, of Minneapolis, Minn.

It will be appreciated that other forms of visual indication mechanism for producing a readable output may be used, such as for example meters, and the like. Additionally, the outputs may be directed to various process control loops if this should be desired.

The previously mentioned relay operated switch arm 84 engages a fixed electrical contact 84a in the inactivated condition of the relay operated switch arm 84 and engages another fixed electrical contact 84b in the activated condition of the relay operated switch arm 84.

The electrical contact points 84b and 78b are connected respectively to ganged relay operated switch arms 86 and 88 respectively. The relay operated switch arms 86 and 88 engage fixed electrical contacts 86a and 88a respectively in the inactivated position of the relay operated switch arms 86 and 88 and contact electrical contact points 86b and 88b respectively in the activated position of the relay operated switch arms. The contacts 86a and 88a are connected to the output terminals of the refractometer 10 and the contacts 86b and 88b are connected to the output terminals of the polarimeter 12.

The previously mentioned contact 84a is connected to a relay operated switch arm 90 engaging a fixed electrical contact 90a in the inactivated position of the relay operated switch arm 90 and engaging another fixed electrical contact 90b in the activated position of the relay operated switch arm 90. The contact 90b is connected to the previously mentioned resistor $R_7$. The contact 90a is connected to a relay operated switch arm 92.

The relay operated switch arm 92 in an inactivated position thereof engages a fixed electrical contact 92a and in an activated position engages a fixed electrical contact 92b. The contact 92a is connected to the previously mentioned resistor $R_5$ and the contact point 92b is connected to the previously mentioned resistor $R_6$.

The previously mentioned contact point 66b is connected with the resistor $R_4$.

The previously mentioned pen 62 is normally poised above the recording medium, such as paper, with which it is used and is only moved down into marking contact with the recording medium upon activation of a normally de-energized pen relay 93.

SEQUENCE OF OPERATIONS

Operation of the analyzer is effected by controlling the opening and closing of the various previously described relay operated switch arms in a predetermined sequence. In the preferred embodiment the sequential operation of the various switch arms is effected by a timing motor 94 driving sequencing cams 95 for operating energization switches 96 for controlling the switch arm operating relays 97, connected mechanically at 98 to the various relay operated switch arms. However, it will be appreciated that other methods of effecting the operation of the relay operated switch arms in accordance with the sequence of operations to be described may be provided in various conventional known ways.

For clarity, the operation of the analyzer will be described in the form of a sequence of steps.

*Step 1.*—Relay operated switch arms 84 and 78 are activated, thereby connecting the refractometer to the recorder input through contacts 84b and 78b. The motor 60 drives the center connection 80 along the potentiometer 64 until the incoming refractometer solids signal is balanced by the potential across that portion of the potentiometer 64 between the connection 80 and the base line 20 at which time the pen 62 has been moved into position ready to record refractometer solids. At the same time, the movable connection 32 of the retransmitting potentiometer 28 is slid therealong. The relay operated switch arm 30 is also energized so that the fixed voltage $V_2$ is applied across the retransmitting potentiometer 28 through the contact 30b. The retransmitting potentiometer 28 sends an amplified signal proportional to the refractometer solids to the amplifier $A_1$. The relay operated switch arm 40 is activated connecting the amplifier $A_1$ to the amplifier $A_2$ which tracks the incoming amplified refractometer solids signal.

*Step 2.*—The relay operated switch arm 40 is inactivated so that the amplifier $A_2$ stores the refractometer solids signal.

*Step 3.*—The pen relay 93 is activated to bring the pen 62 (already moved into position in Step 1 above) into contact with the recording paper to plot the value of refractometer solids.

*Step 4.*—The pen 93 is inactivated to release the pen 62 from the paper. The relay operated switch arm 30 is inactivated thereby disconnecting the retransmitting potentiometer 28 from the reference supply voltage $V_2$ and connecting it to the output of the amplifier $A_4$. In the amplifier $A_4$ the refractometer solids signal stored in the amplifier $A_2$ is multiplied by a fixed factor $k_1$ and is subtracted from an externally applied fixed potential $V_1$. It will be seen that the resultant potential $(V_1 - k_1 \times V_{Rs})$ is derived from a mathematical operation analagous to that by which pol factor $(k_1 - k_1 \cdot Rs)$ is derived and that by suitable choice of circuit values an electrical signal proportion to pol factor is developed. The resultant pol factor voltage is applied across the retransmitting potentiometer 28 by the now inactivated relay operated switch arm 30 through the contact 30a.

At the same time the relay operated switch arms 86 and 88 are activated thereby connecting the polarimeter 12 to the recorder input so that the motor 60 drives the movable contact 80 of the potentiometer 64 to a balance position and also drives the slide arm 32 of the retransmitting potentiometer 28 to a position proportional to magnitude of the incoming pol reading signal from the polarimeter 12.

It will thus be seen that the potential developed between the movable connection 32 of potentiometer 28 and line 20 is proportional both to the magnitude of the pol factor voltage (being developed across the potentiometer 28 as a whole) and to the position of the slide arm 32 on the potentiometer 28 (determined by the magnitude of the pol reading signal) with the result that the net potential developed is proportional to the product of these voltages. This product, which is proportional to the pol percent value, is fed to the amplifier $A_1$.

*Step 5.*—The relay operated switch arm 42 is activated so that the pol percent signal in amplifier $A_1$ is applied to the amplifier $A_3$ which tracks this signal.

*Step 6.*—The relay operated switch arm 42 is inactivated with the result that the amplifier $A_3$ stores the pol percent signal.

*Step 7.*—The relay operated switch arms 78 and 84 become inactivated.

The pol percent potential stored in the amplifier $A_3$ is inverted in the amplifier $A_5$ at constant amplitude and connected through the resistor $R_5$, the inactivated relay operated switch arm 92, the inactivated relay operated switch arm 90 and the inactivated relay operated switch arm 84 to the input 82 of the recorder 16. A return current path is provided through the other servo amplifier input 81, the movable connection 80, the involved portion of potentiometer 64, and the inactivated relay operated switch arm 78 to the base line 20. The potential difference thus applied to the servo amplifier 59 causes it to drive the motor 60 which drives the connection 80 to a balance position and thus moves the pen 62 to a position ready to record the value of pol percent.

*Step 8.*—The pen relay 93 is activated to cause the pen to record the value of pol percent.

*Step 9.*—The pen relay 93 is inactivated to release the pen 62 from the paper. The relay operated switch arm 66 becomes activated thereby disconnecting the fixed calibration voltage $V_4$ from the potentiometer 64. At the same time, the relay operated switch arm 66 moves to contact 66b connecting the refractometer solids signal stored in in amplifier $A_2$ across the potentiometer 64, via resistor $R_4$. At the same time, the relay operated switch arm 92 also becomes activated, connecting the pol percent signal stored in the amplifier $A_5$ to the input of the recorder, via resistor $R_6$. The point at which the slide arm 80 balances is now directly proportional to the pol percent signal (applied to the input of the servo amplifier 59) and inversely proportional to the refractometer signal (applied across the potentiometer wire 64). Thus the final position of the arm 80 in the potentiometer is dependent upon the division of these quantities and thus produces a reading proportional to pol purity.

*Step 10.*—The pen relay 93 is activated to cause the pen to record pol purity.

*Step 11.*—The pen relay 93 de-energizes, releasing the pen 62 from the paper. The relay operated switch arms 66 and 92 de-energize, disconnecting the recorder from the ampilfiers $A_2$ and $A_5$. The relay operated switch arm 48 is activated, thereby causing the amplifier $A_5$ to multiply the output from the amplifier $A_4$ by a factor $k_2$. The output from the amplifier $A_5$ is fed to the amplifier $A_6$ where it is multipled by a further factor $k_3$ and is subtracted from the fixed voltage $V_3$. It will be seen that the resultant difference signal is derived mathematically as $(V_3-(k_2 \times k_3) \times V_{pol})$, which is analogous to the operation involved in computing the estimated extraction $E(K_2-k_2 \cdot P)$. By suitable choice of circuit constants $V_3$ and multiplication factors $k_2$ and $k_3$, an output signal is derived which closely approximates estimated extraction E. The output is connected through the resistance $R_7$ and the activated relay operated switch arm 90 to the input of the recorder.

*Step 12.*—The pen relay 93 is energized to record the value of the estimated extraction.

A further aspect of the invention resides in the provision of the previously mentioned filter 6. The streams of sugar solution encountered during sugar processes are usually turbid and unsuitable for analysis by optical instruments such as the refractometer 10 and polarimeter 12. It is therefore necessary to clarify the solution optically by means of the filter 6.

Figure 3:
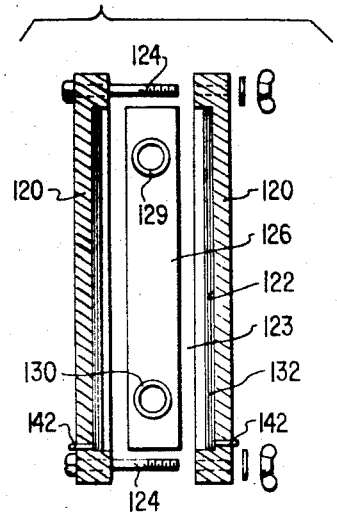
FIGURE 3 is a side view of a portion of a filter forming a part of the apparatus shown in FIGURE 1 with one side cover removed.
Figure 4:
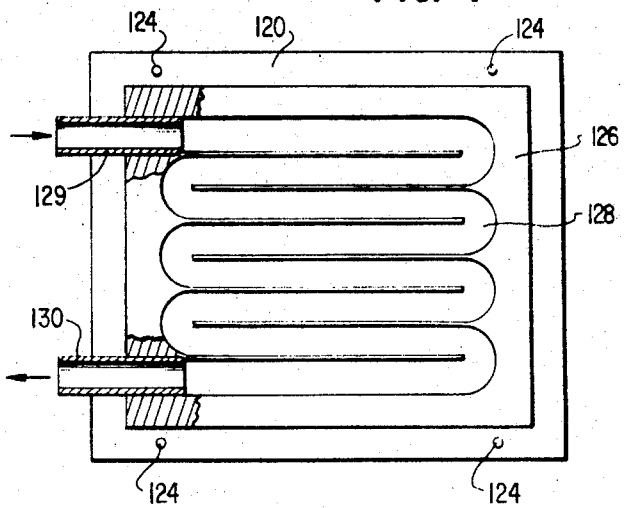
FIGURE 4 is an exploded end view of the filter shown in FIGURE 3.

Referring to FIGURE 3, the filter 6 includes two opposed rectangular side plates 120 having opposed recessed interior surfaces 122 which define a rectangular internal chamber 123 when the plates are secured together in abutting relation by longitudinal fasteners 124 such as bolts. Positioned within the interior chamber 123 is a convoluted metal baffle 126 defining a vertically extending, convoluted, sinuous path 128, shown in FIGURE 4. The sides of the baffle 126 are open. An inlet pipe 129 entering the chamber 123 conducts fluid to the upper end of the baffle 126 so that the fluid is guided downwardly through the sinuous path 126 to an outlet 130 passing out of the chamber 123. Between each side face of the baffle 126 and the adjacent recessed interior surface 122 of each side plate 120 is a composite filter member 132.

Figure 5:
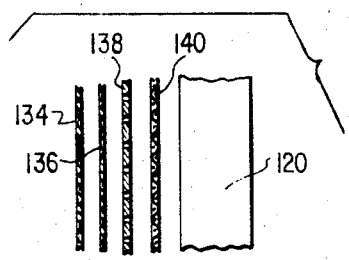
FIGURE 5 is an exploded end view of a portion of a composite filter element forming a part of the filter shown in FIGURE 3.

Referring to FIGURE 5, the composite filter member includes a thin membrane 134 adjacent the baffle 126, a porous backing 136 such as glass paper, a perforated supporting plate 138, and a mesh screen 140 abutting the interior surface 122 of the slide plate 120. Filtrate outlet holes 142 in each side plate 120 adjacent the lower extremity thereof communicate with the mesh screen 140.

As the previously mentioned sample pump 2 places the sample withdrawn from the stream under greater than atmospheric pressure, a small portion of the fluid passing along the sinuous path defined by the baffle plate 126 is forced through the filter members 132 out through the filtrate outlets 142.

By choice of a suitable membrane 134 (in the preferred embodiment the type VC, 0.1 micron pore size membrane produced by the Millipore Corporation, Bedford, Mass., is utilized), the turbidity of the solution passed to the optical instruments can be considerably reduced, thereby permitting successful continuous analysis of the fluid stream.

Another embodiment of the fluid filter shown in FIGURE 6 differs in that the sinuous plate 126 intermediate the filter units is replaced by a vertically extending circular chamber 150 defined by a cylindrical housing 152 (FIGURE 7). The stream is guided into the chamber 150 and subsequently removed therefrom by horizontal tangential inlet and outlet pipes 154 and 155 spaced axially of each other (FIGURE 8) at the upper end of the chamber.

It will be seen that the present invention permits continuous and instantaneous quantitative measurement of various characteristics of a liquid stream containing dissolved solids, some of which are optically active, to be provided. In particular, the provision of a computer permits various division and multiplication operations necessary to compute the pol percent, pol purity and estimated extraction of sugar solution streams to be performed automatically. Particular advantages are also provided by the filter which insures that the polarimeter and refractometer may be utilized successfully despite initial turbidity of the process stream.

Although the invention is described with reference to certain embodiments, it will be apparent to those skilled in the art that additions, deletions and modifications, substitutions and other changes not specifically described and illustrated in these embodiments may be made which will fall within the purview of the appended claims.

We claim:

1. An apparatus for measuring the properties of a liquid containing dissolved solids of which a portion are optically active, said apparatus including:
    polarimetric means for automatically providing a pol reading electrical signal proportional to the concentration of optically active constituents in the liquid,
    refractometric means for automatically providing a refractometer solids electrical signal proportional to the concentration of dissolved solids in the liquid,
    a visual indication mechanism responsive to electrical signals,
    computer means including,
        first circuit means connected with said refractometric means for deriving a pol factor electrical signal functionally related to said refractometer solids electrical signal,
        second circuit means connected with said first circuit means and with said polarimetric means for multiplying said pol factor electrical signal by said pol reading electrical signal to derive a pol percent electrical signal, and
        third circuit means connected with said second circuit means for applying said pol percent electrical signal to said visual indication mechanism.

2. An apparatus as defined in claim 1 further including:
    fourth circuit means for dividing said pol percent electrical signal by said refractometer solids electrical signal to derive an electrical signal proportional to pol purity, and
    means for applying said pol purity electrical signal to said visual indication mechanism.

3. An apparatus as defined in claim 1 wherein said visual indication mechanism includes
    a marker,
    servo means for operating said marker in response to electrical signals entering said visual indication mechanism,
    said computer means further including,
        a potentiometer having end connections,
        a movable connection driven between said end connections by said servo means,
    first circuit means connected with said refractometric means for developing a pol factor signal functionally related to said refractometer solids signal across the ends of said potentiometer,
    electrical storage means for storing an electrical potential,
    sequentially operable connection means including,
        first connection means for periodically connecting said polarimetric means to said recorder to cause said servo means to move said movable connection to a position on said potentiometer proportional to the magnitude of said pol reading signal,
        second connection means operable concurrently with said first connection means to connect said movable connection and an end of said potentiometer to said electrical storage means to store therein a pol percent signal proportional to the product of said pol factor signal and said pol reading signal, and
        third connection means operable after disconnection of said first connection means to connect said electrical storage means to said visual indication mechanism to provide a visual indication of the pol percent signal.

4. An apparatus in accordance to claim 3 wherein said first circuit means includes:
   first amplifying means for multiplying said refractometer solids electrical signal by a first fixed factor, and
   a constant value first source of potential in connection with the input of said first amplifying means and of opposite polarity to said refractometer solids electrical signal.

5. An apparatus as defined in claim 2 wherein said servo means includes
   servo amplifier means connected with an electrical motor means,
   said electrical motor means drivingly connected to said marker,
   a second potentiometer having
      end connections,
      a movable connection on said second potentiometer connected electrically to one side of said servo amplifier and moved by the motor,
   an electrical return connection between one end of said second potentiometer and the other side of said servo amplifier,
   electrical input connections interposed in said return connection for connecting an electrical signal in opposite sense to the potential developed across that portion of said second potentiometer in series with said servo amplifier means,
   the response of said motor means being such on unbalance of the potentials applied to the servo amplifier means as to move said movable connection on said second potentiometer in a direction to balance the potentials,
   said computer means further including
      fourth connection means for electrically connecting said first circuit means across said second potentiometer to apply said refractometer solids electrical signal to said second potentiometer, and
      fifth connection means for electrically connecting said electrical storage means to said electrical input connections.

6. An apparatus in accordance to claim 2 further including
   second amplifying means connected with said electrical storage means for multiplying said pol percent electrical signal by a predetermined extraction factor, to derive an intermediate signal,
   third amplifying means connected to the output of said second amplifying means for multiplying the said intermediate signal by a predetermined factor, and
   a constant value second source of potential connected with the input of said third amplifying means in opposite polarity to the said intermediate signal, for deriving an electrical extraction signal, and
   means for applying said electrical extraction signal to said visual indication mechanism.

7. An apparatus as defined in claim 1 wherein the liquid is present in the form of a stream, the apparatus further including;
   directing means for directing a portion of the stream to said polarimetric means and to said refractometric means, said directing means including
   a permeable filter membrane,
   means for conducting a portion of the stream to one side of said membrane,
   means on the other side of said membrane for conducting fluid to said polarimetric means and said refractometric means, and
   means for applying a pressure differential across said membrane in a sense to force liquid from said one side to said other side thereof.

References Cited

UNITED STATES PATENTS

| 2,409,853 | 10/1946 | Heijn | 356—114 |
| 2,712,265 | 7/1955 | Ingelstam | 356—128 |
| 3,191,178 | 6/1965 | Anscherlik | 356—73 |

RONALD L. WIBERT, Primary Examiner

CONRAD CLARK, Assistant Examiner

U.S. Cl. X.R.

356—116, 128